M. LACHMAN.
METAL WHEEL.
APPLICATION FILED MAY 31, 1919.

1,393,797. Patented Oct. 18, 1921.

INVENTOR
Maurice Lachman
BY
Townsend Decker
ATTORNEYS

UNITED STATES PATENT OFFICE.

MAURICE LACHMAN, OF NEW YORK, N. Y., ASSIGNOR, BY MESNE ASSIGNMENTS, TO BETHLEHEM STEEL COMPANY, OF BETHLEHEM, PENNSYLVANIA, A CORPORATION OF PENNSYLVANIA.

METAL WHEEL.

1,393,797.　　　　Specification of Letters Patent.　　Patented Oct. 18, 1921.

Application filed May 31, 1919. Serial No. 301,022.

*To all whom it may concern:*

Be it known that I, MAURICE LACHMAN, a citizen of the United States, and a resident of New York, in the county of New York and State of New York, have invented certain new and useful Improvements in Metal Wheels, of which the following is a specification.

My invention relates to metal wheels comprising a metal rim and separate metal spokes welded to the inside of said rim.

The object of my invention is to provide for the ready and convenient welding of the outer end of the spoke to the rim.

Another object of my invention is to permit the utilization of commercial forms of bar iron such as T bar for the rim of the wheel in the construction of wheels of this character.

The invention consists essentially of a metal wheel having a rim provided with an internal circumferential strengthening hub or projection and metal spokes welded by their ends to said rib.

The invention consists further in details of construction and methods of manufacture hereinafter more particularly described and specified in the claims.

1 indicates a metal bar adapted to form the rim or tread of the wheel and having an internal projecting rib or flange 1′. 2 indicates welding projections from said rib, of a number corresponding to the number of spokes employed in the finished wheel. As indicated by the cross-section the bar 1 is substantially a T bar and the flange or rib 1′ thereof forms essentially the stem of the T. The arms of the T or body of the bar in the finished wheel constitute the rim. Prior to the welding operation the stem of the T may be cut away or notched at 10 and at a suitable number of points to provide the projections 2, this being done prior to the formation of the straight length of bar into the circumference of the rim.

In constructing the wheel a suitable length of bar 1 prepared as shown in the side elevation is taken sufficient, when bent, to form the rim of the wheel, and to facilitate the construction, welding of the spokes to the projections 2 and the finishing of the welds is done prior to the bending operation. The bending of the bar after the welding of the spokes forms the same into the circumference of the felly part of the wheel and at the same time causes the outer or free ends of the welded spokes to converge or become assembled in the relation which they occupy in the hub of the finished wheel.

As the construction of hub and the manner of securing the spokes therein form no part of my invention, illustration and description of the same is omitted.

Figure 1:
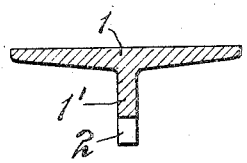
Figure 1 is a cross-section of a metal bar suitable for forming the rim of the wheel.
Figure 2:
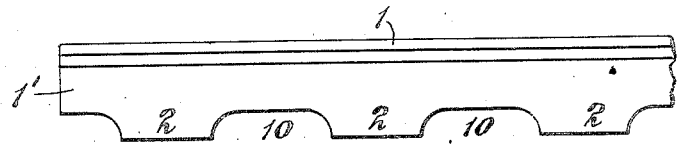
Fig. 2 is a side elevation of a portion of said bar.
Figure 3:
Fig. 3 is a side elevation of a portion of a spoke prior to its preparation for welding.
Figure 4:
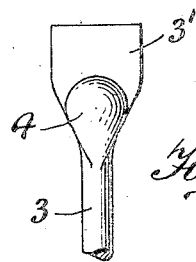
Fig 4 shows the same prepared for welding to the rim.
Figure 5:
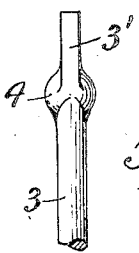
Fig. 5 is an edge view of Fig. 4.

3 indicates the spoke members of the wheel. Each spoke in the present instance is solid and preferably circular in cross-section. The blank from which the spoke is formed comprises a length of rod of uniform cross-section as indicated in Fig. 3. This is flattened, as indicated at 3′ in Figs. 4 and 5, to form the end with an edge suitable for welding to the edge of the projection 2′. This flattening or pinching may be done in a suitable press and in a way to provide an edge on 3′ of substantially the width and thickness of the edge of the projection 2′ of the rib, so that the two edges may be readily united by a butt-welding operation.

To give increased strength to the structure it is desirable to employ in the body of the spoke a greater amount of material in cross-section than is required in the cross-section of the projection 2. Therefore the operation of forming the end of the spoke into the welded projection 3′, when done by a forging or pressing operation, results in the production of a swell or enlargement 4 indicated in the various figures.

Figure 6:
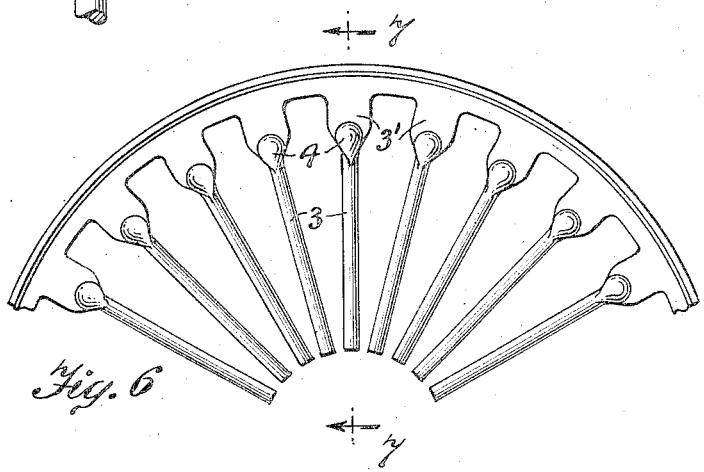
Fig. 6 is a side elevation of a portion of the finished wheel.
Figure 7:
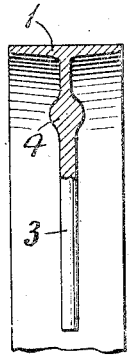
Fig. 7 is a cross-section on the line 7—7 Fig. 6.

The parts having been prepared as described, the spokes of the wheel are welded to the bar 1 used for the rim while said bar is straight. After the spokes have been welded the bar is bent to the shape of the finished wheel shown in Fig. 6, causing the outer or free ends of the spokes which, immediately after the welding, project from the bar parallel to one another, to converge. The swell or enlargement 4 provides additional strength near the point of welding or attachment of the end of the rod or spoke to the bar constituting the rim.

Figure 8:
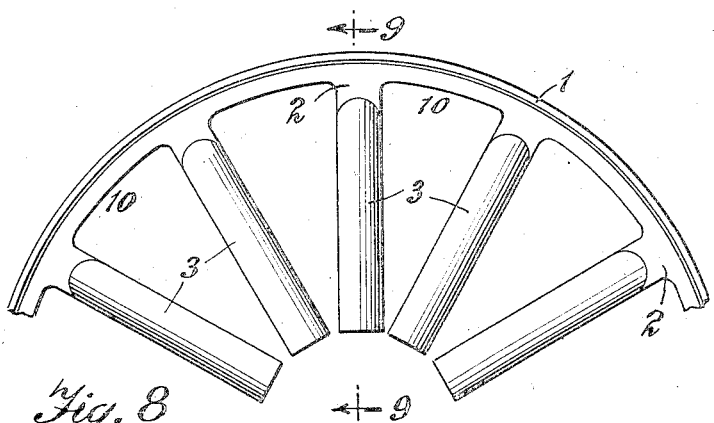
Figs. 8 and 9 illustrate by side elevation and section at line 9—9 Fig. 8 the construction when tubular spokes are used.
Figure 9:
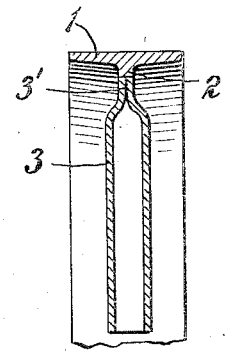

In Figs. 8 and 9 the spoke 3 is shown as of tubular form. Its end is pinched or flattened as indicated at 3' to pinch the opposite walls together into an edge of cross-section substantially the same in width as the edge of the rib, and the two edges are welded directly together preferably by an electric butt-welding operation. Otherwise the construction and operation of welding are the same as already described for the case of a solid rib or spoke.

What I claim as my invention is:

1. A metal wheel having a metal rim provided with an internally projecting flange or rib and separate spokes butt-welded by the edge of their extremities to the edge of separated projections of said flange.

2. A metal wheel having a metal rim provided with an internally projecting strengthening rib notched to form separate projections and separate spoke members having flattened ends flattened to substantially the width and thickness of said projections and butt-welded thereto.

3. A metal wheel having a metal rim provided with an internally projecting flange or rib formed with separate welding projections and separate spokes butt-welded by an edge of their extremities to the edge of said projections.

4. A metal wheel having a metal rim provided with an internally projecting strengthening rib having separate welding projections and separate spoke members having a flattened end flattened to substantially the dimensions of the butt welding projections of the rib and welded thereto.

5. In a metal wheel, the combination with a rim consisting of a section of T bar the stem of which forms an internal rib on the rim while the arms of the T form the tread of the wheel rim and separate metal spokes butt T-welded by their ends to the ends of separate projections formed in the stem of the T.

Signed at New York, in the county of New York and State of New York, this 28th day of May, A. D. 1919.

MAURICE LACHMAN.

Witnesses:
F. B. TOWNSEND,
IRENE LEFKOWITZ.